US011400492B2

(12) United States Patent
Berger et al.

(10) Patent No.: US 11,400,492 B2
(45) Date of Patent: Aug. 2, 2022

(54) SORTING DEVICE

(71) Applicant: Wipotec GmbH, Kaiserslautern (DE)

(72) Inventors: Hermann Berger, Lamspringe (DE);
Eugen Stumpf, Wedemark (DE);
Sergej Janzen, Seelze (DE);
Hans-Sebastian Höhler, Hildesheim (DE); Louis Hoffmeister, Bockenem (DE); Moritz Müller, Hannover (DE)

(73) Assignee: Wipotec GmbH, Kaiserslautern (DE)

( * ) Notice: Subject to any disclaimer, the term of this patent is extended or adjusted under 35 U.S.C. 154(b) by 0 days.

(21) Appl. No.: 17/066,352

(22) Filed: Oct. 8, 2020

(65) Prior Publication Data

US 2021/0107035 A1    Apr. 15, 2021

(30) Foreign Application Priority Data

Oct. 9, 2019 (DE) .......................... 102019127189.4

(51) Int. Cl.
*B07C 5/36* (2006.01)
*B65G 47/64* (2006.01)

(52) U.S. Cl.
CPC .............. *B07C 5/36* (2013.01); *B65G 47/647* (2013.01)

(58) Field of Classification Search
CPC .......... B07C 5/36; B65G 47/57; B65G 47/96; B65G 47/44; B65G 47/647; B65G 2207/00; B65G 21/12; B65G 21/14
USPC .......................................... 198/861.3, 861.5
See application file for complete search history.

(56) References Cited

U.S. PATENT DOCUMENTS

| | | | | |
|---|---|---|---|---|
| 8,376,130 B2* | 2/2013 | Deyanov | ............ | B65G 15/105 198/842 |
| 8,770,378 B2* | 7/2014 | Bauer | .................... | B65G 21/12 198/369.2 |
| 2002/0166752 A1 | 11/2002 | Takahashi | | |
| 2012/0037477 A1* | 2/2012 | Cristoforetti | ........ | B65G 47/647 198/601 |
| 2020/0355246 A1* | 11/2020 | Vegh | .................... | B65G 15/105 198/842 |

FOREIGN PATENT DOCUMENTS

| | | |
|---|---|---|
| DE | 21 08 023 A1 | 8/1972 |
| DE | 101 12 333 A1 | 12/2001 |
| DE | 10232215 A1 | 2/2004 |
| JP | S59 4480 A | 1/1984 |
| JP | 2009 137 690 A | 6/2009 |

OTHER PUBLICATIONS

German Patent Office action dated Jun. 3, 2020 in DE 102019127189.4.
European Extended Search Report in EP 20200750.6, dated Mar. 9, 2021.

* cited by examiner

*Primary Examiner* — Michael McCullough
*Assistant Examiner* — Jessica L Burkman
(74) *Attorney, Agent, or Firm* — The Culbertson Group, P.C.

(57) ABSTRACT

A sorting device with a transport medium pivotable between two pivot positions and placed around two shafts. The pivot axis about which the transport medium is pivotable is spaced apart from the shaft axes and an upper run formed by the transport medium is straight in both pivot positions.

17 Claims, 6 Drawing Sheets

SORTING DEVICE

TECHNICAL FIELD OF THE INVENTION

The present invention relates to a sorting device for rejecting products from a conveying stream.

BACKGROUND OF THE INVENTION

In industrial mass production, produced goods are subjected to various quality controls during and also at the end of production. Non-compliant products are separated out of the product stream and fed to a special treatment, or scrapped and disposed of. Quality checks are also carried out while the produced goods are being taken to the end consumer, thus within a trade chain, and non-compliant products are separated out. For example, quality controls are checked from labels on the product, for which different quality levels are defined, so-called grading.

In particular in the case of a fast-running automatic product-handling system, a quick and precisely working sorting device is necessary for the sorting. In order to achieve as high as possible a throughput rate (high quantity per unit of time), several processing lanes arranged in parallel next to each other are often used. This leads to a large space requirement and to a large width of the several sorting devices placed next to each other.

In the production of foodstuffs, there is additionally also the need for simple and quick assembly/disassembly, in particular when unpackaged foodstuffs are to be sorted and therefore a hygienic cleaning of all parts of the overall plant has to be effected regularly. Furthermore, all components of the transport system and of the sorting device provided for the contact with the unpackaged foodstuff must be suitable for this contact with the foodstuff. Detailed proof of this in the form of a certificate or a written confirmation often needs to be provided both for the basic material used and for its further processing.

For the actual sorting, various basic principles are known, such as e.g. blowing off by means of blowing nozzle(s), lateral diverting/deflecting/pushing out (changing lane) by means of mobile guide plates or pushers, vertical movement into other height levels, as well as combinations thereof, and many others.

The known sorting mechanisms also include opening a sorting gap or a space in the conveyor line on which the products are moved before or after the sorting station. Here, at least a part of the conveyor unit can be displaced horizontally back and forth in order to temporarily provide a space for separating out the products. However, the sorting gap can also be created by pivoting a part of the conveyor unit up or down. In all named cases the sorting device must work quickly enough and precisely enough in order to be able to separate out any desired individual product in a targeted manner, and at the same time not to compromise and not to disturb the unaffected transport of the preceding and the following product. In place of discrete goods, the named sorting mechanisms can in principle also be applied to bulk goods.

SUMMARY OF THE INVENTION

An object of the invention is to provide a sorting device, in some cases with a modular construction, which offers both a high sorting speed, simple assembly/disassembly, easy cleanability and cost saving through the use of only a few, preferably unlosable, parts. In addition, the proposed technical solution is to be easily extendable widthwise (laterally) in multiple lanes and have only a few parts touching the product.

A sorting device according to one aspect of the present invention has a first, preferably horizontal and fixed, axis of rotation and a first shaft formed around it. Spaced apart from the first axis of rotation, a second axis of rotation parallel to the first axis of rotation is provided, with a second shaft formed around it. An endless transport medium, which can be one or more belts or conveyor belts lying side by side, is placed around both deflection shafts. The upper section of the transport medium, which leads from the first shaft to the second one, is to be called run lying above (upper run for short) and is used for supporting and conveying products. The section of the transport medium lying underneath the upper run and leading back from the second shaft to the first shaft again is to be called lower run. The first shaft can be driven in order to move the transport medium around the two shafts and thereby convey products lying on the upper run.

The products which are not to be separated out of the conveying stream can be guided along a path, called "conveying path" in the following, through or via the sorting device. In contrast, products to be separated out leave the sorting device through a sorting gap.

The second shaft, and the transport medium circulating it, is pivotable about a pivot axis between two pivot positions such that a sorting gap in the conveying path is thereby opened or closed. In a first pivot position the transport medium with the second shaft is pivoted out of the conveying path and the sorting gap is opened such that products are separated out of the conveying stream in a targeted manner through the sorting gap.

The sorting gap may be located upstream of the pivotable transport medium, with the result that the product to be separated out (for example due to gravity) falls out of the conveying stream through the sorting gap and does not reach the transport medium. However, an embodiment in which the sorting gap is formed downstream of the transport medium is also conceivable. Then, the product is conveyed along the transport medium and—depending on the pivot position thereof—reaches the sorting gap or the continuation of the normal conveying path. (In theory, several different pivot positions can also be taken up in the case of this conveying principle, in order to transfer the products to subsequent conveying means in each case at different height positions, and thereby to sort them).

In contrast, if the sorting gap is closed because the second shaft and the transport medium circulating it is taking up the second pivot position and thereby moving the upper run back into the conveying path, the products are not separated out and instead are transported further along the normally provided conveying path.

In implementations according to this aspect of the invention the second shaft is pivotable about a fixed pivot axis which does not coincide with the axis of the first shaft. This results in a construction with a simpler design compared with the solution in which the first deflection shaft is simultaneously drive shaft and pivot axis, since there the pivotability and the drive must be realized in a narrow space about the same axis. At the same time, the simplified construction of the mechanism according to the invention can be cleaned more easily, since the area of the pivot axis is more easily accessible. (The term "fixed" is understood to mean that the relevant component does not change its position in space relative to a base body, within normal manufacturing tolerances. For its part, in normal operation the base body can for example be connected to a spatially fixed machine frame or correspond to this, and/or be connected to the shop floor).

In combination and interaction with this pivot axis arrangement, it is furthermore provided that the upper run—unlike in the state of the art—remains straight in both pivot positions, thus is not bent or deflected in each case by contact with other components of the device. By remaining "straight" in both pivot positions it is meant that the upper run intersects a conveyance plane parallel to the conveyance direction and perpendicular to the pivot axis along substantially a straight line. This straight or linear condition is met across the entire width of the upper run, which further results in the upper run defining substantially a plane in each pivot position. In particular it is provided according to the invention that the upper run is not impeded in its straight alignment by a pivot axis body formed around the pivot axis in either of the two pivot positions. It is thereby ensured according to the invention that no abrasive wear is produced by frictional contact between the upper run and components of the device which do not move along with it, which include in particular the pivot axis or a pivot axis body forming the pivot axis. The sorting device obtains this configuration according to the invention through the special fixed arrangement of the first shaft A, the movable arrangement of the second shaft B and the fixed arrangement of the pivot axis $S_K$, wherein the dimensions of a pivot axis body forming the pivot axis are such that in both pivot positions an abrasive wear-producing contact of the pivot axis body with a transport medium guided around the two shafts A, B is prevented. Hygiene requirements, preferably from the food sector, are hereby met.

Besides the upper run, the lower run may also be unimpeded in its straight extent from the first shaft to the second one by the pivot axis body in both pivot positions. In both pivot positions the transport medium then forms a cross section ("belt cross section") in the conveyance plane which is composed of the two circular arc-shaped sections of the transport medium guided around the first and around the second shaft and the substantially linear sections formed by the upper run and the lower run which join these two sections. In implementations in which the lower run also remains straight, neither the upper run nor the lower run is deflected between the first and second shafts in either of the two pivot positions, and also in some implementations, during the transition from one pivot position into the other.

Precisely two shafts A, B may be provided for receiving the transport medium, with the result that it is guided or deflected by none other than the two shafts A and B. Then, in each pivot position the upper run (and preferably also the lower run) extends straight from the first shaft to the second one. This results in as small as possible a number of parts, and the design complexity is correspondingly low.

A sorting device according to the invention for sorting moving products thus comprises a first, fixed shaft A, which extends along a first axis $S_A$ in a preferably horizontal axial direction X (substantially horizontal when installed in an operating condition), as well as a second shaft B, which is spaced apart from the first shaft A in a direction Y running perpendicular to the X-axis and extends along an axis $S_B$ parallel to the axis $S_A$.

An endless transport medium R is placed around the first shaft A and the second shaft B and forms an upper run T for supporting and for conveying products P which, lying on the upper run, can be moved along a conveying path driven by the transport medium.

The second shaft B is pivotable about a fixed pivot axis $S_K$ parallel to the first and second axes $S_A$, $S_B$ out of a lower pivot position U into an upper pivot position O and back, wherein, by taking up one of the two pivot positions, a sorting gap is produced in the transport path for separating out selected products from the normal conveying path. By taking up the other pivot position, the sorting gap is closed in order to move the products further along a conveying path. The distance between pivot axis $S_K$ and the axis $S_B$ of the second shaft B corresponds to the pivot radius here.

The pivot axis $S_K$ is spaced apart from the first axis $S_A$ and arranged parallel to it. Furthermore, the arrangement of the first and second shafts and of the pivot axis is chosen such that the upper run is or remains straight in each case in both pivot positions, by ensuring for each pivot position that the pivot axis, or a pivot axis body forming the pivot axis, does not impede or even deflect the straight extent of the upper run, in order to prevent abrasive wear during the conveying operation or the temporary stretching of the transport medium during pivoting. This preferably also applies to the lower run W.

The advantages according to the invention for preventing abrasive wear can be achieved when the pivot axis or a pivot axis body does not affect the straight extent of the upper run in any pivot position. For this purpose, the pivot axis can be arranged outside or inside the belt cross section. In the case of arrangement outside the belt cross section, the mounting of a pivot axis body may be simpler to implement. On the other hand, the pivot axis body could block the path that the products take during conveying or separating out.

A particularly advantageous embodiment of the invention therefore provides that the transport medium circulates around the pivot axis; the pivot axis is therefore arranged inside the belt cross section between upper run and lower run. For one thing, in this arrangement the pivot axis cannot impede the transport of the products. For another, the possible spacing of the pivot axis from the first axis of the first shaft A is thereby limited. The closer these two fixed axes lie to each other, the less the spacing of the first shaft from the second one changes during pivoting, with the result that a pretension prevailing in the transport medium can be largely maintained during pivoting. In the following description it is therefore assumed that the pivot axis is located between the upper run and the lower run of the transport medium.

This arrangement advantageously takes up little installation space, which can remain free in particular underneath and above the transport medium. On the other hand, the possible pivot angle is affected by positioning the pivot axis inside the transport medium when an abrasive wear-producing contact between pivot axis (more precisely: between a pivot axis body, which physically forms the pivot axis) and the transport medium is to be prevented. In order, at the same time, to be able to design the sorting gap forming due to the pivoting to be sufficiently large, an advantageous embodiment of the invention provides for positioning the pivot axis as close as possible to the first fixed axis $S_A$, with the result that the distance between pivot axis and second axis $S_B$ turns out to be as large as possible. As a result of the larger distance between pivot axis and second shaft B, a smaller pivot angle about the pivot axis is already enough for the formation of a sufficiently large sorting gap.

The smallest possible distance between first axis $S_A$ and pivot axis brings another further advantage with it when the pivot axis is arranged inside the transport medium. Since the pivot axis is not identical to the fixed first axis $S_A$ according to the invention, during pivoting the transport medium moves relative to the pivot axis, with the result that the pivot axis approaches the upper run or lower run. However, in order to prevent disruptive abrasive wear during operation, the pivot axis (more precisely: a pivot axis body along which the pivot axis may extend) should not touch the transport medium, or should only touch it with as little friction as possible, and then without deflecting the transport medium. The permissible pivot angle taking this into account becomes greater the closer the pivot axis, or the pivot axis body, is arranged to the fixed first axis $S_A$. The pivot axis $S_K$ therefore preferably has a spacing $y_A$ from the first axis $S_A$ and a spacing $y_B$ from the second axis $S_B$, wherein $y_A < y_B$, preferably $y_A < 0.2 \cdot y_B$.

Assuming that the normal conveying path runs substantially horizontally (a slight incline, which does not endanger the secure supporting of the products on the upper run, is harmless here), the second shaft with the transport medium can either be pivoted upwards or downwards out of the conveying path, in order to form the previously described sorting gap. If the pivoting is to be effected upwards, it is expedient to position the pivot axis $S_K$ relative to the first axis $S_A$ such that it lies relatively close to the underside of the upper run in the lower pivot position and at the same time has as large as possible a spacing from the inside of the lower run. During pivoting into the upper pivot position, the distance between pivot axis body and upper run then becomes larger, whereas the distance between a pivot axis body (which in some cases may extend across the entire width of the device) and lower run becomes smaller. The smaller or larger the above-named distances between pivot axis body and upper run or lower run, respectively are chosen to be, the greater is the total permissible pivot angle where the pivot axis body comprises a member extending across a portion of the width of the transport medium and between the upper and lower runs. If, in contrast, the pivoting from the horizontal is to be effected downwards, the above-named consideration applies analogously and inversely, in order to enable as large as possible a pivot angle downwards.

Furthermore, a pivot axis body which extends along the pivot axis across a portion of the width of the transport medium between the upper and lower runs is preferably formed with as small as possible an external diameter, in order to maintain a sufficient spacing from the upper run or lower run in all pivot positions in this way too.

In order to pivot the second shaft B about the pivot axis, a manually or automatically drivable pivot mechanism is provided, which engages either directly on the second shaft B or on a mounting H receiving the second shaft B. The pivot mechanism can comprise a controllable actuator, in particular a pneumatic actuating drive, which transfers the second shaft B out of the lower into the upper pivot position and back. A section of the pivot mechanism can be arranged substantially fixed to a plant frame, whereas a second section engages on the mounting H or the second shaft B. The pivot mechanism can preferably be easily released from the second shaft or its mounting, in particular without tools, in order to facilitate the removal of the second shaft and/or its mounting H together with the transport medium.

The pivot mechanism expediently engages on the mounting H or the second shaft B such that the transport path on the upper run of the transport medium is not impeded by it. A U-shaped bracket is conceivable for example, the apex of which extends in the X-direction sufficiently far above (or also below) the transport medium, while the two legs, starting from the apex, extend on both sides of the transport medium (thus in front of it and behind it seen in the X-direction) down or up to the mounting H or second shaft B and engage there. A piston rod of a pneumatic actuating drive can engage on the apex of the bracket, for example.

The above observations have assumed until now that a pivot axis body extending along the pivot axis is provided which extends through between upper run and lower run in the X-direction and parallel to the two axes $S_A$, $S_B$. However, the advantages according to the invention are already achieved by the positioning according to the invention of the pivot axis, thus of the pivot point, as long as the pivotability of the second shaft about the pivot axis is ensured. This can be realized, for example, by two bearing points (which may each comprise a respective pivot axis body) which lie in front of and behind the transport medium, seen in the X-direction, and define the position of the pivot axis, but without a member extending between and connecting the two bearing points to each other in the X-direction. Such an arrangement of bearing points or two respective pivot axis bodies still lies on the pivot axis and bears the second shaft or guides it about the pivot axis at a distance that defines the pivot radius. This embodiment has the advantage that the area between upper run and lower run can remain free of any part of a pivot axis body, with the result that the danger of an abrasive wear-producing contact between pivot axis body and transport medium is even better prevented. The mounting H guiding the second shaft can also protrude beyond the pivot axis or the second axis $S_B$, for instance in order to laterally cover a gap existing between the first shaft and the pivot axis.

In contrast, a pivot axis body connecting the two bearing points increases the stability of the whole device and possibly simplifies the pivot mounting. In this case, an advantageous development of the invention provides that the pivot axis body forming the pivot axis $S_K$ maintains, in both pivot positions, a gap running in the X-direction over the whole width of the upper run between the pivot axis body and the upper run, in order to prevent unwanted contacts and abrasive wear.

In the course of pivoting, the second shaft B is guided about the pivot axis on a circular path. In some implementations of the invention this guiding is provided by a mounting H that is elastic or rigid in its longitudinal direction and extends from the pivot axis $S_K$ (or from bearing points formed there) to the second shaft B. By "longitudinal direction" is meant here the direction or the radius from the pivot axis to the second axis $S_B$ of the second shaft B. The mounting can be formed as a rigid framework construction and have two struts as integral elements, which are arranged (seen in the X-direction) substantially in front of and behind the transport medium (that is, on either lateral side of the transport medium in the X-direction) and extend in the Y-direction in each case from a bearing point to the second shaft and thus support the second shaft on the pivot axis or guide the shaft about it.

However, with sections provided for this, the mounting H can also extend in the X-direction into or completely through the area between upper run and lower run, in order to form the mounting as a whole more stably and, for example, to connect the two above-named struts to each other. The mounting can also be equipped with a low-friction contact surface facing the inside of the upper run. This contact surface can serve to support the upper run in a frictionless or low-friction manner on its inside facing away from a product lying thereon, in order to be able to convey the products on the upper run more securely and in a positionally stable manner.

The mounting can also be formed elastic or resilient, in order to be able to generate a pretensioning force between pivot axis and second axis $S_B$ of the second shaft B in the radial direction. This pretensioning force pushes the second shaft B away from the shaft A, with the result that the transport medium circulating around the first and second shafts A, B is pretensioned with a counterforce corresponding to the pretensioning force. The pretensioning force can be adjustable, for instance via a spring mechanism with an adjustable pitch length.

A tension force acting in the transport medium can, of course, alternatively or additionally also be generated by corresponding dimensioning of the transport medium itself, for instance in that the distance between first and second shafts is chosen such that the transport medium can only be stretched over the shafts.

In order to hold the pivot axis fixedly, in one embodiment of the invention fixed axle receivers F are provided. The axle receivers serve to receive a pivot axis body or elements for the formation of a bearing point of the pivot axis fixedly, wherein the mounting H of the second shaft B is mounted relative to the fixed axle receivers and is pivotable about the pivot axis.

In order to mount the mounting H pivotable in the axle receivers F, an embodiment of the invention provides that a pivot axis body can be inserted into an axle receiver F, wherein the pivot axis body itself is mounted non-rotatable with respect to the axle receiver F, for example, and thus forms a substantially fixed and rotatably fixed component. The mounting of the second shaft B is then mounted pivotable on the rotatably fixed pivot axis body via suitable bearing means (roller bearings, slide bearings, anti-friction bushes, etc.). For example, a bearing bushing which forms a low-friction material pairing with the pivot axis body could be pushed onto the fixed pivot axis body. A section of the mounting H can then be connected to the bearing bushing in a rotatably fixed manner. The bearing bushing can extend over the entire length of the pivot axis body, which can in turn extend over the entire width of the transport medium, for example. Then, several sections of the mounting H lying one behind another in the X-direction or a continuous mounting section along the pivot axis body can also engage on the bearing bushing, in order to achieve a particularly stable guiding of the mounting about the pivot axis. Several individual bearing bushings are also conceivable as bearing elements, on which appropriate sections of the mounting H engage.

Instead of a continuous pivot axis body, which can extend over the whole width of the transport medium in the manner of an axle rod, the pivot axis body can also be formed by individual (preferably two) short sections in the area of the axle receivers or on both sides of the transport medium, which then simultaneously form parts of bearing elements. Here too, a first section of the bearing elements (then forming the pivot axis body) would be connected to the axle receiver and in this respect rotatably fixed, whereas a second section of the bearing elements can be arranged frictionless relative to the first section and rotatable on it and can be connected to a section of the mounting H.

Alternatively, the pivot axis body itself is mounted rotatable in the axle receivers and securely connected to the mounting, in order to perform the pivoting movements with it. For example, in each case an axle rod or bearing journal could be inserted into an axle receiver as fixed bearing element, whereas a pivot axis body formed sleeve-shaped is pushed onto the bearing journal in a low-friction manner as bearing bushing and for its part is or can be securely connected to the mounting of the second shaft. The pivot axis body can again extend over the entire width of the associated transport medium, with the result that several elements of the mounting H lying one behind another in the X-direction can also be fastened to the pivot axis body at various X-positions.

The pivot axis body (or the bearing elements cooperating with it, which are intended also to be covered by the term pivot axis body in the following and claims) can be removed from the axle receivers—preferably without tools. The particularly easy disassembly or the modular replacement of individual components of the sorting device is thereby simplified. (The possibility of tool-free removal also reduces the number of losable parts, since loose screws can be dispensed with, for example. The sorting device according to the invention therefore preferably has no losable individual parts, in order to meet the requirements of the food industry in particular.)

According to an advantageous embodiment of the invention, the axle receivers F have slots V, into which a section of the pivot axis body (or respective separate pivot axis body) can be introduced for the fixed positioning thereof. Expediently, these slots are open towards a side facing away from the first axis $S_A$, with the result that the pivot axis body can be inserted into the axle receiver in the direction of the first axis. Due to the open design of the slots, the pivot axis body can be easily removed from the axle receiver. In a simple embodiment, the slots have an approximately U-shaped design, into which the pivot axis body with suitable sections (axle journals) can be inserted or pushed to the base of the slot.

In some implementations the slot can remain open on its side facing away from the first shaft A and at the same time facing the second shaft B, without the pivot axis body being able to fall out of the axle receiver. Since the second shaft B and the mounting H coupled to it are pretensioned in the direction of the first shaft A via the pretensioning force prevailing in the transport medium, the pivot axis body coupled to the mounting can be removed from the axle receiver by overcoming the pretensioning force and through corresponding movement in the direction of the second shaft B. However, in normal operation the pretensioning force is always chosen sufficiently high to push the pivot axis body in the direction of the base of the slot and in the direction of the first shaft A, and thus into the fixed axle receiver F. The slots provided in the axle receivers can also be formed as a labyrinthine slotted guide, in order to additionally secure the pivot axis body against unintentional release. For this purpose, the slotted guide can have guide grooves merging into each other at right angles or obliquely, in order to be able to lock the pivot axis body in the axle receiver securely and yet without tools.

The formation of the axle receiver with slots makes the modular formation of the sorting device according to the invention and the quick and preferably tool-free disassembly thereof possible. The pivot axis body can be lifted out of the slots of the axle receivers by overcoming the pretensioning force. Following this, the pretensioning force in the transport medium can be completely relieved by moving the pivot axis body (or separate bodies), outside the axle receiver(s), back towards the first shaft A, since then the mounting H and with it the second shaft B can follow this movement, and the distance between first and second shafts is reduced.

The arrangement of pivot axis body, mounting H and second shaft B can then be taken out of the device in the X-direction. The no longer pretensioned transport medium can then hang down freely from the first shaft A and likewise be easily replaced, as will also be described below.

The axle receivers may each comprise flat side walls, which extend perpendicular to the X-axis and are manufactured for example from sheet metal, rigid plastic or a material with similar properties. The slots or slotted guides can thus be easily introduced (e.g. punched, milled). At the same time the plates, which may have a thickness of a few millimeters, take up very little space in the X-direction and can easily be positioned from above or below also between several sorting devices of a sorting plant, which lie one behind another in the X-direction. The plates of the axle receivers may be displaceable but rotatably fixed along a fixed tie bar L extending in the X-direction, and lockable in a target position. The X-spacings of the plates can thus be varied by displacing along the tie bar and adjusted to transport media with different widths. Furthermore, additional side walls can be slid onto the tie bar if further sorting devices according to the invention are to be arranged one behind another in the X-direction. Alternatively, the individual axle receivers can also be firmly welded to the tie bar.

According to some implementations, the tie bar has a cross-sectional profile transverse to the X-direction which is designed complementary to the profile of an opening in the axle receivers, with the result that individual axle receivers can be arranged rotatably fixed but at various positions on the tie bar with engagement of the two profiles. According to an advantageous variant of the invention, the tie bar is only fixedly clamped on one side and protrudes freely in the X-direction. It is not supported at its free end and via this free end allows the simple replacement of axle receivers.

According to the invention the pivot axis is spaced apart from the first axis $S_A$ of the first shaft A since the separation of the two axes simplifies the design of the structure of the sorting device. There is also less bearing wear. Furthermore, it is provided that a gap remains between the pivot axis body $K_K$ and the first shaft A, in order to prevent contact of these two components and any abrasive wear resulting therefrom.

The above-named sorting device comprises a first fixed shaft A, which can also act as drive shaft. The second shaft B is pivotable, in order, if required, to produce a sorting gap in the conveying path for rejecting products. However, products are often also conveyed in multiple lanes, thus along tracks or conveying paths lying very close to one another. The product throughput can thereby be increased, also because in the case of products being conveyed in parallel the rejecting process on one track does not impede the conveying on other tracks. In order to be able to convey and in particular also reject products in multiple lanes, it is useful to arrange several of the sorting devices according to the invention one behind another in the X-direction, and thereby to form a multi-lane sorting plant. Each sorting device then forms a module, which comprises at least the following components serving only the respective module: a transport medium R (conveyor belt, one or more belts or chains etc.), a pivot axis body (or bodies) extending along pivot axis, a shaft B that is pivotable about the pivot axis and around which the transport medium circulates, as well as a mounting H that guides the shaft B about the pivot axis and engages on it. In contrast, the first shaft A likewise necessary for each sorting device can be formed as a, preferably driven, fixed shaft A' jointly serving all sorting devices, around which the transport medium of each individual sorting device module is guided. The first shaft A' jointly serving all modules is accordingly longer than the shaft B of each individual module. Expediently, the lengths of the second shafts B of the individual modules add up to the overall length of the first shaft A'. Naturally, the first shaft A' can also be chosen longer, in order to make the future installation of further sorting devices and thus an increase in the number of lanes possible.

The formation of a common first shaft for all sorting devices simplifies the design of the entire device. All transport media of the individual sorting devices are received by the common first shaft A' and—when this shaft is simultaneously a drive shaft—driven, with the result that only a single drive is necessary for all sorting devices. Here, the individual sorting devices lie preferably aligned one behind another in the X-direction, wherein the individual lanes of the sorting plant then run parallel to each other and transverse to the X-direction. The transport medium of a lane can then be pivoted by pivoting the second shaft B associated with this lane, in order to reject a product. At the same time, products can be conveyed or rejected on the other lanes independently thereof by pivoting the respective transport medium or the respectively associated second shaft into the pivot position desired in each case.

The pivot axes of the individual sorting devices can preferably be inserted in the above-described manner in each case releasably into axle receivers F, which for their part are preferably formed with the above-named slots or slotted guides for receiving the individual pivot axes. For each module, two flat side walls serving as axle receiver can be provided, which are preferably displaced or positioned along the previously described fixed tie bar in the X-direction and locked, in order to be able to receive the pivot axis body associated with the module between them. In the case of a suitable formation of the mounting of the pivot axis body, one side wall can also be used to receive two pivot axis bodies, lying directly one behind another in the X-direction, of two adjacent modules. For this, the side wall could have two side wall sections lying one behind another in the X-direction, a section of each of which is used to receive an end area of the one or of the other pivot axis body, adjacent to it, respectively.

According to an advantageous embodiment of the invention, which additionally makes the removal of individual modules easier, the first shaft A or A' protrudes cantilevered from a fixed base body M, with the result that an end of the first shaft facing away from the base body M is not supported or mounted. The first shaft, preferably acting as drive shaft, extends here in the X-direction over the entire width of the sorting plant, in order to be able to receive and drive all transport media of the individual modules lying one behind another in the X-direction. Since the free end of this shaft is expediently not mounted or supported or connected to other components, the individual transport media can be taken off the shaft in the direction of the free end (covers that can be removed quickly and preferably by hand, which do not affect the operation of the shaft mechanically and are used, for example, for operational safety, can cover the free shaft end if necessary, however, and be easily removed for the replacement of the modules or transport media).

Through the separation according to the invention of the pivot axis or pivot axes from the first (common) shaft A' and the above-named design of the individual sorting devices, it is possible to take the individual modules out of the sorting plant simply and individually, for instance for maintenance, for cleaning or for replacement. Further modules indirectly or directly adjacent to them in the X-direction do not have to be completely removed from the sorting plant for this, which significantly reduces the downtime of individual sorting devices or of the whole sorting plant. The replacement of a module installed between other modules in a sorting plant according to the invention could proceed as follows:

1. Release the pivot drive of the selected module from the mounting H or the second shaft B.
2. Release the pivot axis body $K_K$ with the mounting H from the axle receivers F by overcoming the tension force prevailing in the transport medium (after this the second shaft B is only still connected to the first shaft A via the no longer pretensioned transport medium and can hang downwards on it, together with the mounting H and the pivot axis body $K_K$).
3. Release further pivot axis bodies and pivot drives of adjacent modules between the selected module and the free end of the first shaft A', with the result that the transport medium of the selected module to be removed can be taken off the shaft in the X-direction over the transport media of the other modules still arranged on the first shaft, together with the second shaft associated with the module, its mounting H and its pivot axis body.
4. The components of the module removed in this way can be inserted back into the sorting plant in the reverse sequence.
5. After hooking the pivot axis of the selected module into the associated axle receivers, the associated transport medium is pretensioned again. The associated pivot drive is to be installed.
6. The possibly released pivot axes and pivot drives of further modules are to be secured again, after which the sorting plant is operational again.

The fixed first axis $S_A$ and the likewise fixed pivot axis $S_K$, parallel to the first axis, together define an imaginary plane E. According to an advantageous embodiment of the invention, it is provided that the axis of the second shaft moves through this plane E during the transition from one pivot position into the other. Through this requirement it is possible to bring about the pivoting movement of the second shaft partially automatically, thus without external loading of the shaft or its mounting. If the second pivot axis lies in the plane E and the pivot axis $S_K$ lies between the first and second axes $S_A$, $S_B$, then the second axis $S_B$ is as far away as possible from the first axis $S_A$ along its possible pivot path about the pivot axis. In this arrangement, the tension force acting on the two shafts through the transport medium is accordingly greatest, with the result that the second shaft is pushed out of this position to relieve the pretensioning force on one of the two sides of the plane E, or in the direction of one of the two pivot positions. The pivot drive pivoting the second shaft can then advantageously be formed such that it only has to move the shaft from one side of the plane E to the other. The second shaft then covers the remaining pivot path to take up the respective sought pivot position on its own, driven by the tension force in the transport medium. For this part of the pivoting, actuation energy to be introduced externally is then advantageously not required.

According to an alternative embodiment, the second shaft remains on the same side of the named plane in both pivot positions, wherein the tension force in the transport medium is always pulling the second shaft in the direction of one of the two pivot positions. To take up the other pivot position, the pivot mechanism therefore only has to load the shaft or its mounting in this direction or rather on one side. The movement back into the other inclined position can then be effected solely by relieving the tension force in the transport medium, for instance by operating the pivot mechanism free of force (by decoupling from a drive, decompressing a pneumatic cylinder to ambient pressure, etc.). Any emergency operating features to be provided can utilize this effect, for instance in the case of the failure of the pivot drive a pivot position defined as safe is always taken up automatically.

These and other advantages and features of the invention will be apparent from the following description of representative embodiments, considered along with the accompanying drawings.

DESCRIPTION OF REPRESENTATIVE EMBODIMENTS

Figure 1:
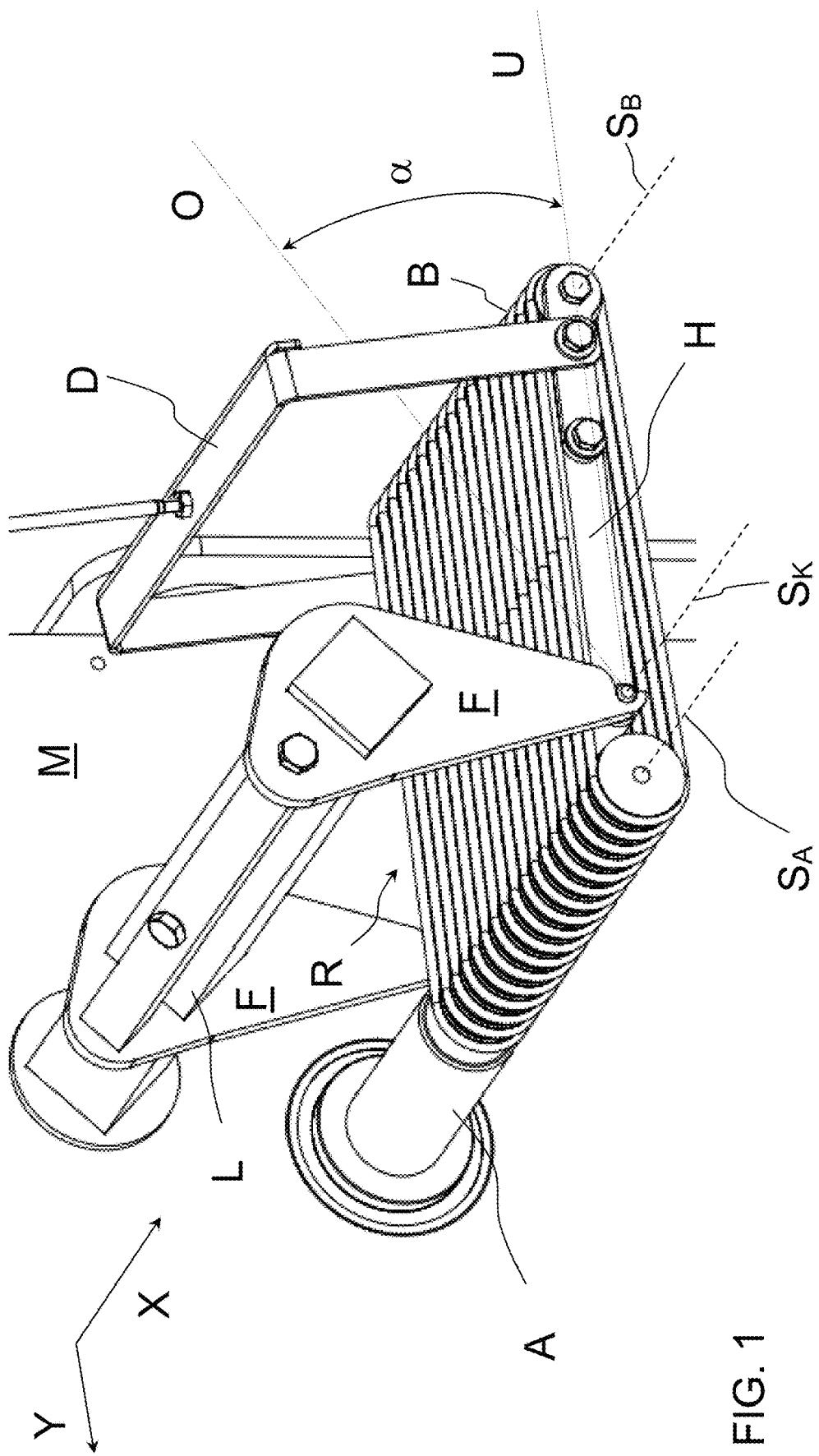
FIG. 1 is a perspective view of a sorting device according to the invention.

The sorting device according to FIG. 1 comprises a first shaft A, which extends in a first direction X about a first axis $S_A$. The first shaft A is arranged fixed on a base body M, not represented in more detail, and can be driven to rotate about its axis $S_A$. The first shaft A protrudes cantilevered from the base body M and is therefore not mounted at its free end.

Figure 2:
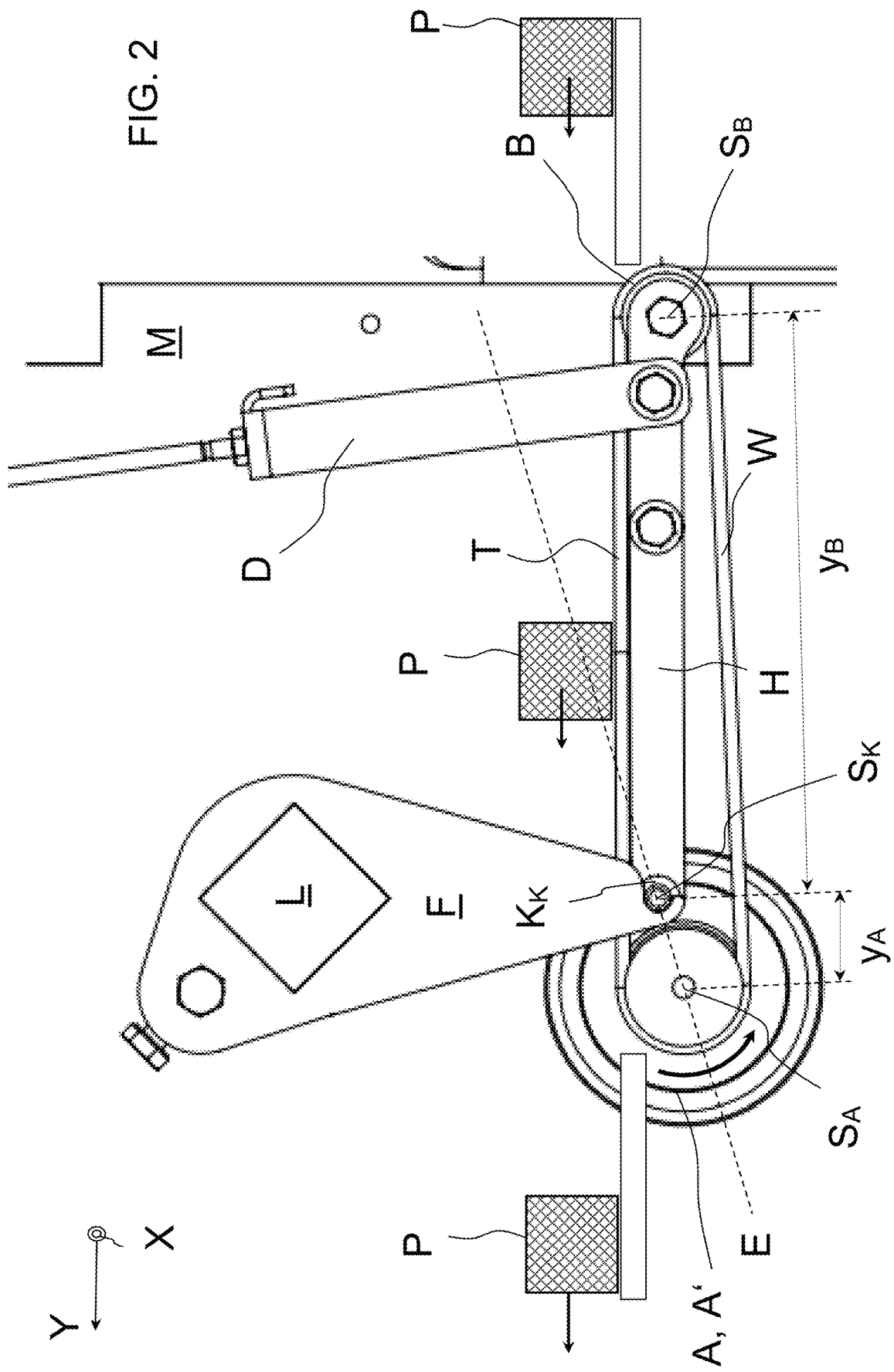
FIG. 2 is a schematic side view of the device according to FIG. 1 in the lower pivot position.

Parallel to the first shaft A, a second shaft B extends around its axis $S_B$. A transport medium R formed of several individual belts running parallel to each other, with a pretension, is placed around the first and second shafts A, B. The upper side of the transport medium R acts as supporting surface for products P (see FIG. 2), in order to convey the products, through rotation of the first shaft A, in a second direction Y, a conveying direction, orthogonal to the first direction X. The section of the transport medium R lying on top forms the upper run T. As can be seen in FIG. 2, the upper run T forms part of a conveying path, along which individual products P can be conveyed over the transport device (from right to left in the figure example). It is also apparent from FIG. 2 that upper run T defines essentially a straight line in the plane of the drawing sheet and essentially a plane extending perpendicular to the plane of the drawing sheet. The plane of the drawing sheet in this view extends parallel to the conveying direction but perpendicular to the first direction X.

A fixed pivot axis $S_K$, about which the second shaft B is pivotable out of a lower pivot position U into an upper pivot position O and back, extends parallel to the first axis $S_A$. For this purpose, the second shaft B is received rotatably in a mounting H, which extends from the second shaft B to the pivot axis $S_K$. A bracket D, connected to a pivot drive not represented in more detail, engages on the mounting H for this purpose. The bracket is movable such that the mounting H, and with it the second shaft B, moves out of the lower pivot position U about the pivot axis $S_K$ into the upper pivot position O (see also FIG. 3 with regard to this). The section of the transport medium R guided around the second shaft B follows this pivoting movement, with the result that a sorting gap G opens up in the conveying path, through which products P to be rejected can be separated out.

Figure 4:
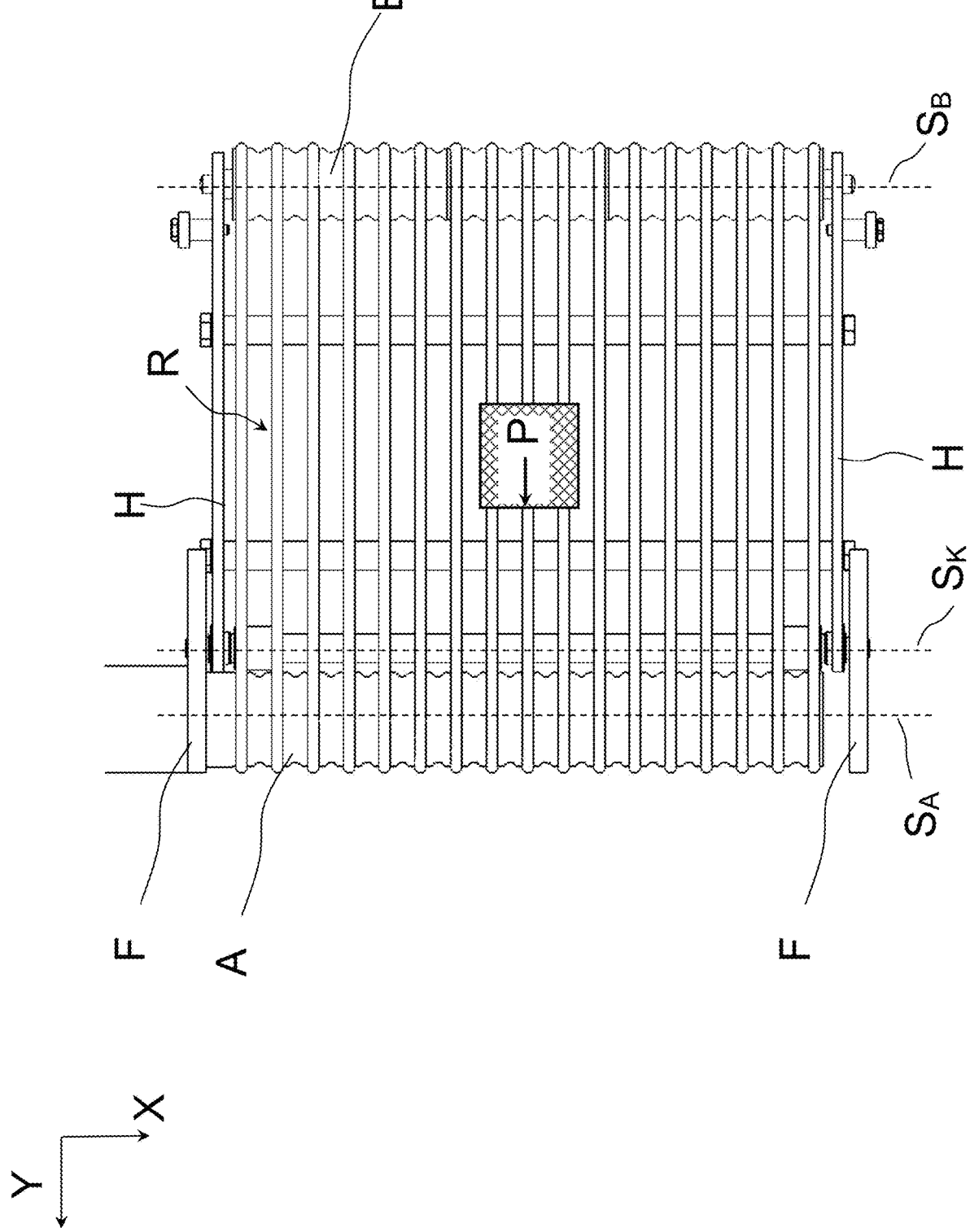
FIG. 4 a top view of the device according to FIG. 1.

The mounting H is connected in a rotatably fixed manner to a pivot axis body $K_K$ formed along the pivot axis $S_K$, which can be seen in particular in the top view according to FIG. 4. The pivot axis body $K_K$ is mounted, via a bearing bushing not represented in more detail, rotatable about an axle rod, which in turn is arranged rotatably fixed in two axle receivers F fixedly connected to the base body M.

The axle receivers F are formed by two side walls, for example in the form of two flat support plates, which can be displaced, with an engagement profile, along a fixed tie bar L formed complementary thereto in the X-direction and locked. The tie bar L is arranged on the base body M, not represented in more detail, and protrudes freely in the X-direction from there. In the process it lies sufficiently far above the conveying path that the product transport or the pivoting into the upper pivot position O is not impeded.

The transport medium R circulates around the pivot axis $S_K$, which therefore lies between the upper run T and the lower run as well as between the two shafts A and B. The diameter of the pivot axis body $K_K$ is chosen much smaller than the diameter of the first shaft A. At the same time, the distance $y_A$ from the pivot axis $S_K$ to the first axis $S_A$ is much smaller than the distance $y_B$ from the pivot axis $S_K$ to the second axis $S_B$. These two properties of the pivot axis body make it possible to pivot the second shaft B over a relatively large pivot angle α between the two pivot positions U, O, without the pivot axis body $K_K$ touching the upper run T or even deflecting it.

FIG. 2 shows the sorting device according to the invention in the lower pivot position U. The products P fed from the right arrive in the area of the second shaft B along a conveying path on the transport medium R and are transported along the upper side of the upper run T to the first shaft A, where they are taken over by a device, not described in more detail, and conveyed further. In the lower pivot position U, the pivot axis body $K_K$ lies just underneath the inside of the upper run T, but without touching it. The mounting H engaging on the pivot axis body $K_K$ is designed such that, in this lower pivot position U, it rests against the downward facing inside of the upper run T with a supporting section in a low-friction manner, in order to brace the upper run T against products P lying thereon.

Figure 3:
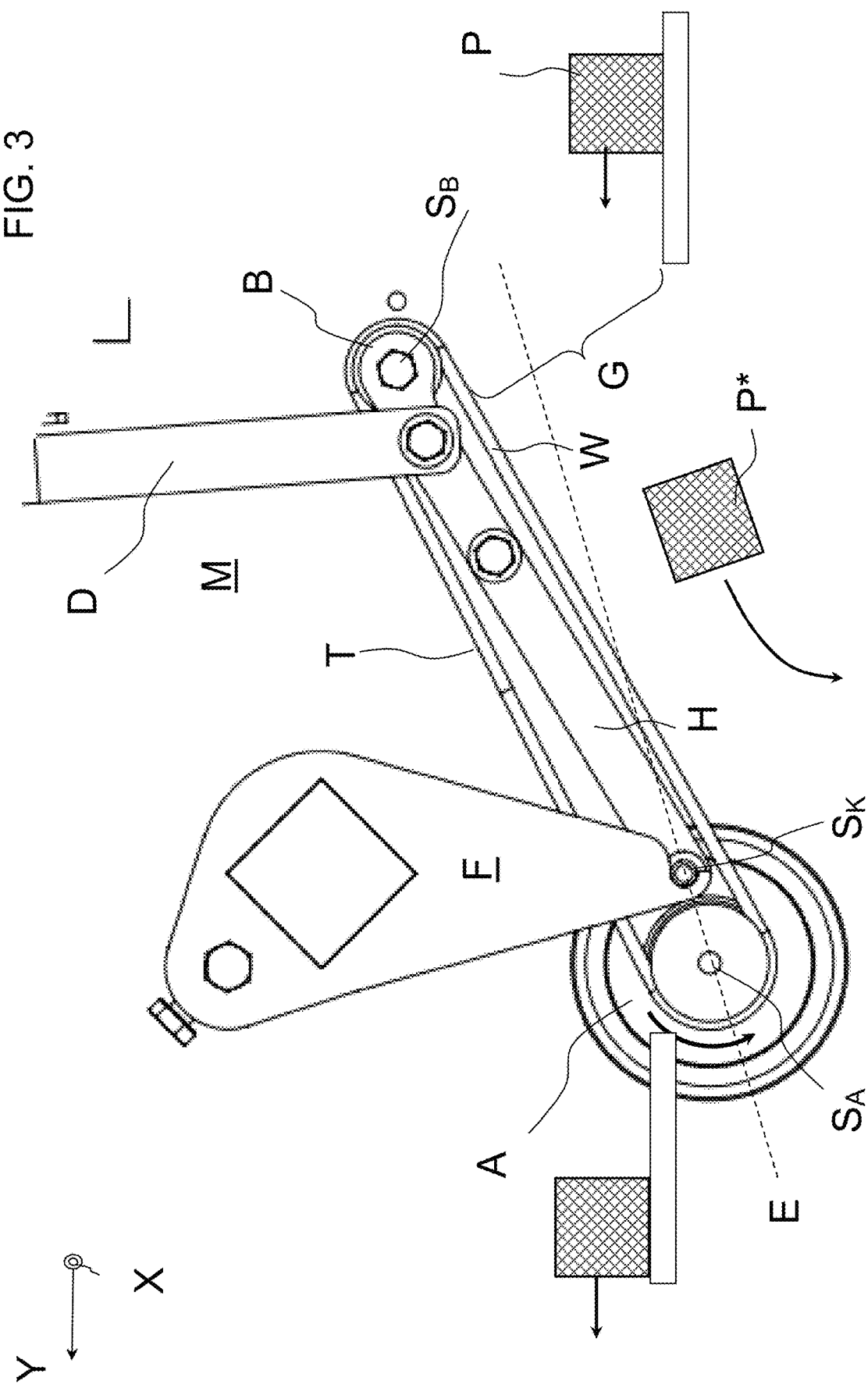
FIG. 3 the device according to FIG. 1 in the upper pivot position.

FIG. 3 shows the sorting device in the upper pivot position O, which has been taken up through corresponding actuation of the bracket D. Through the sorting gap G formed in the process, individual products P* can be separated out from the product stream in a targeted manner. It will be noted from FIG. 3 that upper run T still defines essentially a straight line in the plane of the drawing sheet.

In the course of pivoting, the position of the pivot axis body $K_K$ changes relative to the transport medium R. Now, the pivot axis body lies further away from the upper run T and relatively close to the lower run W, but again maintaining a small gap in order to prevent abrasive wear between the transport medium R and the pivot axis body $K_K$ in this pivot position too. At the same time, the supporting section formed by the mounting H has separated itself from the underside of the upper run T.

The first axis and the pivot axis $S_K$ lie fixed in an imaginary plane E. During pivoting, the axis $S_B$ of the second shaft B migrates from one pivot position O, U into the other through this plane E, wherein the distance between the first and second axes $S_A$, $S_B$ is greatest when the second axis $S_B$ lies in the plane E. Correspondingly, the pretensioning force generated between the two shafts A, B by the transport medium R is greatest at this moment. Beyond the plane E, the second shaft B is therefore pushed in each case in the direction of one of the two pivot positions U, O, in order to reduce the pretensioning.

FIG. 4 shows components of the sorting device according to the invention in top view. The axes $S_A$, $S_B$ and $S_K$ extending parallel to each other in each case in the X-direction, with the associated shafts A, B and the pivot axis body $K_K$, can be seen. The shafts A, B are profiled and provided to receive belts running parallel to each other and together forming a transport medium, which together form a supporting surface for products P to be transported. The pivot axis body $K_K$ extends through between the transport medium R over the whole X-width of the transport device in this example, and is received at both of its ends by the mounting H. It is mounted rotatable in the two side wall-like axle receivers F, which in turn are fastened to the fixed tie bar L, not represented in FIG. 4. Although the illustrated example embodiment includes the axle receivers F on either side of the transport medium in the X-direction with the example pivot axis body $K_K$ extending across the entire width of transport medium R, it will be noted from the top view of FIG. 4 that each axle receiver F is sufficiently narrow to fit between adjacent elements which make up the transport medium R.

The device according to the invention is easy to disassemble. For this, it is provided that the axle receiver F has slots V for receiving the pivot axis body $K_K$ or its bearing elements, as is represented by way of example in FIG. 5. An opening V in the form of a semi-circular slot, which is open towards its side facing away from the first axis $S_A$, is provided in each side wall of the axle receiver F (the two axes $S_A$, $S_B$ are represented only schematically here). Via the pretensioning force prevailing in the transport medium, which acts on the second shaft B and the mounting H thereof, the pivot axis body $K_K$ is pushed in the direction of the first axis $S_A$ and thus into the slots V. In the case of a sufficiently large pretensioning, the pivot axis body therefore cannot leave the opening V by itself, and in conjunction with the bracket D engaging on the mounting H, the pivot axis body $K_K$ is held securely in the slots V during operation.

Figure 5:
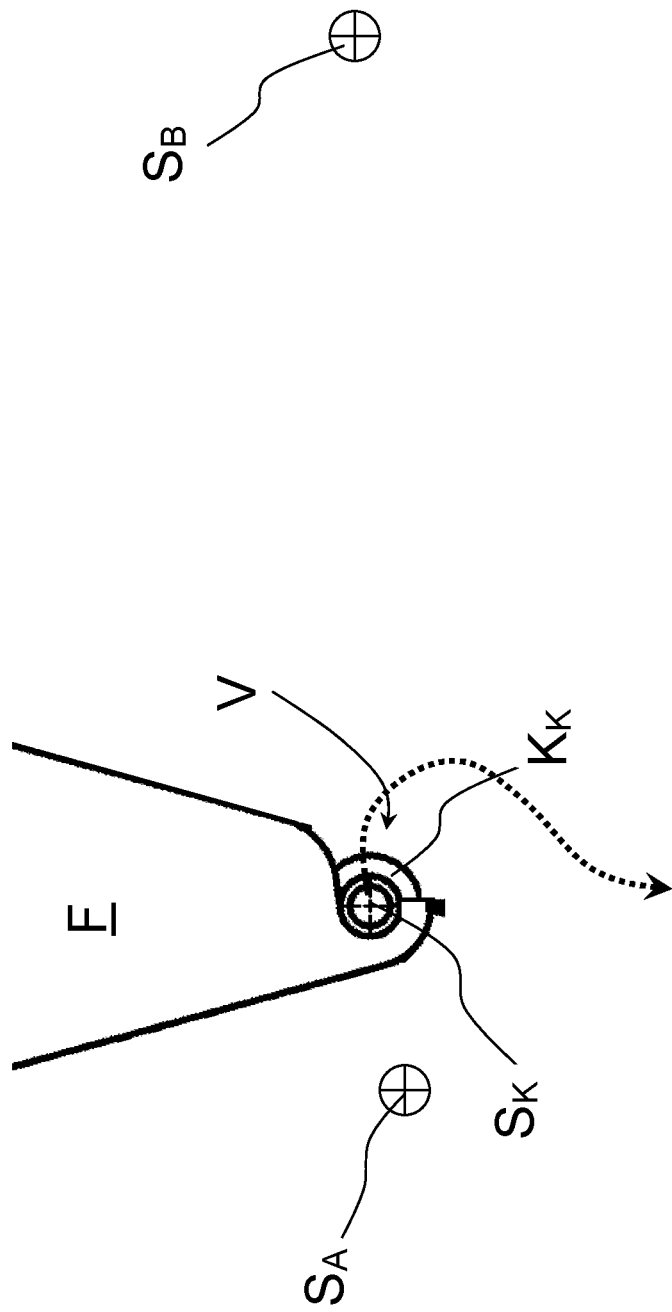
FIG. 5 a detailed view of an axle receiver F.

By overcoming the pretensioning force, thus by moving the pivot axis body $K_K$ in the direction of the second shaft B, it can be lifted out of the slots V and thus separated from the fixed axle receivers F, for example along the dotted line in FIG. 5. If the bracket has previously also been released from the mounting H or from the (not represented) pivot drive (preferably without tools), then the module formed of pivot axis body $K_K$, mounting H, second shaft B and optionally the bracket D can be released with its transport medium R from the base body M or from the drive shaft A. Since the drive shaft A protrudes freely, the removal of the transport medium (or also only individual parts or belts thereof) is not blocked by any further fittings and can be effected correspondingly quickly.

Figure 6:
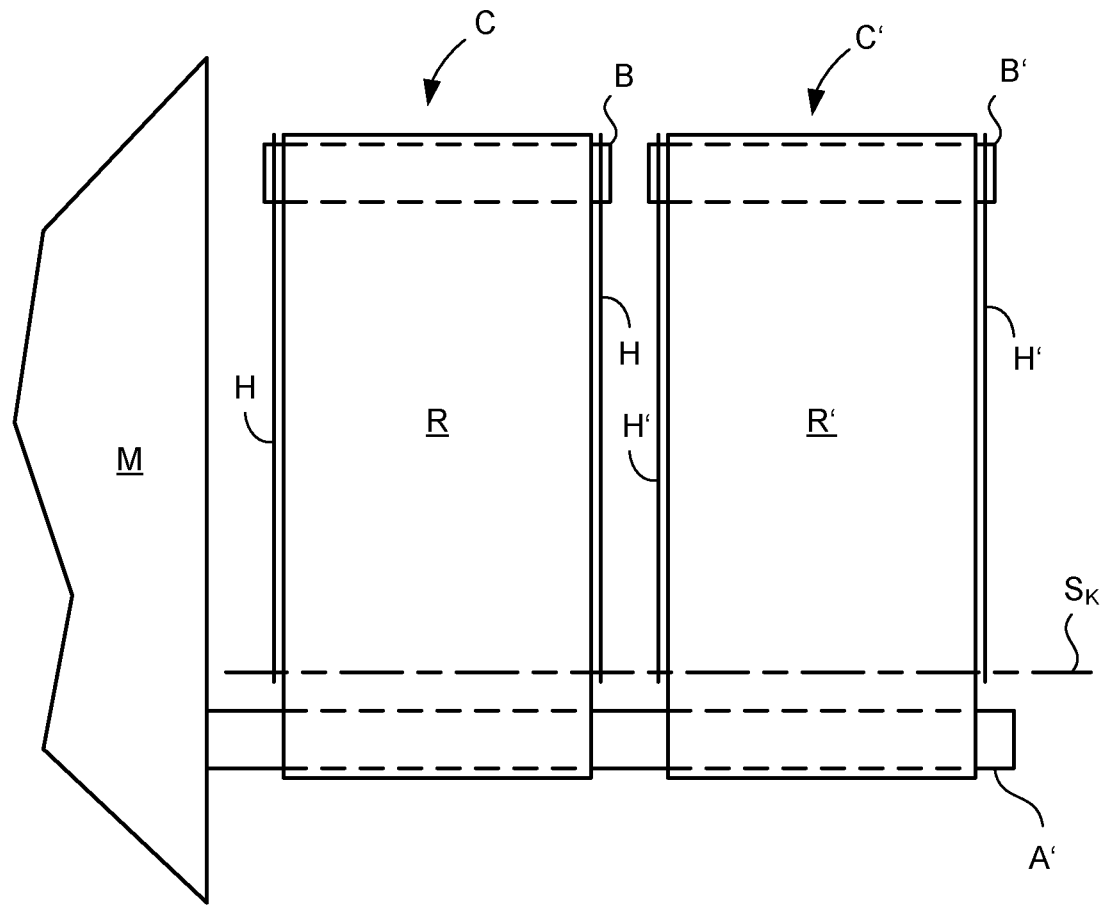
FIG. 6 is a schematic plan view of an apparatus according to the invention having multiple sorting devices arranged as modules sharing a common first shaft.

Advantageously, several of the above-named modules can also be arranged one behind another in the X-direction and thereby form a sorting plant in the form of a multi-lane system. A schematic representation of such a multi-lane system is shown for example in FIG. 6 in which the common shaft A' supported on base body M serves all modules. The example system of FIG. 6 includes two modules C and C' each comprising a respective sorting device as described in connection with FIGS. 1-3. The sorting device comprising module C includes a conveyor medium R mounted on common first shaft A' and second shaft B, with the second shaft B connected via mountings H so as to be pivotable about pivot axis $S_K$ as in the example of FIGS. 1-3. The sorting device comprising module C' includes a conveyor medium R' mounted on common first shaft A' and second shaft B', with the second shaft B' connected via mountings H' so as to also be pivotable about pivot axis $S_K$ as in the example of FIGS. 1-3. Thus the respective second shaft B of each individual module (that is the second shaft B of module C and the additional second shaft B' of module C') can be moved into the one or other pivot position O, U (FIG. 1) independently of the adjacent module (wherein in each case one pivot drive is to be provided for each module). It should be noted that each module C and C' in FIG. 6 will include a respective bracket D, pivot body $K_K$, and axle receivers F as discussed above in connection with FIGS. 1-3, although these elements are omitted from FIG. 6.

As used herein, whether in the above description or the following claims, the terms "comprising," "including," "carrying," "having," "containing," "involving," and the like are to be understood to be open-ended, that is, to mean including but not limited to. Also, it should be understood that the terms "about," "substantially," and like terms used herein when referring to a dimension or characteristic of a component indicate that the described dimension/characteristic is not a strict boundary or parameter and does not exclude variations therefrom that are functionally similar. At a minimum, such references that include a numerical parameter would include variations that, using mathematical and industrial principles accepted in the art (e.g., rounding, measurement or other systematic errors, manufacturing tolerances, etc.), would not vary the least significant digit.

Any use of ordinal terms such as "first," "second," "third," etc., in the following claims to modify a claim element does not by itself connote any priority, precedence, or order of one claim element over another, or the temporal order in which acts of a method are performed. Rather, unless specifically stated otherwise, such ordinal terms are used merely as labels to distinguish one claim element having a certain name from another element having a same name (but for use of the ordinal term).

In the above descriptions and the following claims, terms such as top, bottom, upper, lower, vertical, and the like with reference to a given feature are made with reference to the orientation of the structures shown in the drawings and are not intended to exclude other orientations of the structures.

The term "each" may be used in the following claims for convenience in describing characteristics or features of multiple elements, and any such use of the term "each" is in the inclusive sense unless specifically stated otherwise. For example, if a claim defines two or more elements as "each" having a characteristic or feature, the use of the term "each" is not intended to exclude from the claim scope a situation having a third one of the elements which does not have the defined characteristic or feature.

The above-described preferred embodiments are intended to illustrate the principles of the invention, but not to limit the scope of the invention. Various other embodiments and modifications to these preferred embodiments may be made by those skilled in the art without departing from the scope of the present invention. For example, in some instances, one or more features disclosed in connection with one embodiment can be used alone or in combination with one or more features of one or more other embodiments. More generally, the various features described herein may be used in any working combination.

REFERENCE CHARACTERS

α a pivot angle
A first shaft
A' first (common) shaft
B second shaft
B' additional second shaft
C Sorting device module
C' Additional sorting device module
D bracket
E plane
F axle receiver
G sorting gap
H mounting
$K_K$ pivot axis body
L tie bar
M base body
O upper pivot position
P product
R transport medium
$S_A$ first axis
$S_B$ second axis
$S_K$ pivot axis
T upper run
U lower pivot position
V slot
W lower run
X, Y spatial directions
$y_A$ spacing between first axis $S_A$ and pivot axis $S_K$
$y_B$ spacing between second axis $S_B$ and pivot axis $S_K$

The invention claimed is:

1. A sorting device including:
  (a) a first shaft mounted on a base body with a longitudinal axis of the first shaft comprising a first axis extending in a first direction;
  (b) a second shaft spaced apart from the first shaft and positioned relative to the first shaft so that a longitudinal axis of the second shaft comprising a second axis extends parallel to the first axis, the second shaft being pivotable about a pivot axis between a lower pivot position and an upper pivot position where the pivot axis is spaced apart from, and extends substantially parallel to, the first axis; and
  (c) an endless transport medium placed on the first shaft and the second shaft to form an upper run for supporting and for conveying products in a conveying direction substantially perpendicular to the first direction, the upper run in both the lower pivot position and upper pivot position of the second shaft extending substantially linearly in a conveyance plane extending parallel to the conveying direction and perpendicular to the first direction.

2. The sorting device of claim 1 wherein the endless transport medium forms a lower run between the second shaft and the first shaft lying opposite to the upper run with respect to the first shaft and second shaft, the lower run extending substantially linearly in the conveyance plane in both the lower pivot position and the upper pivot position of the second shaft.

3. The sorting device of claim 2 wherein the pivot axis lies between the upper run of the endless transport medium and the lower run of the endless transport medium.

4. The sorting device of claim 1 wherein the pivot axis has a spacing ($y_A$) from the first axis and a spacing ($y_B$) from the second axis and wherein $y_A < y_B$.

5. The sorting device of claim 4 wherein $y_A < 0.2 \cdot y_B$.

6. The sorting device of claim 1 wherein the pivot axis is defined along a pivot axis body and wherein in both the upper pivot position and the lower pivot position there is a respective upper gap between the pivot axis body and the upper run, the respective upper gap extending in the first direction over an entire width of the upper run.

7. The sorting device of claim 1 further including a shaft mounting which extends from the pivot axis to the second shaft and is operable to guide the second shaft between the lower pivot position and the upper pivot position on a section of a circular path about the pivot axis.

8. The sorting device of claim 1 further including a first axle receiver located on a first side of the endless transport medium in the first direction and a second axle receiver located on a second side of the endless transport medium in the first direction, wherein the pivot axis is defined along (i) a respective pivot axis body releasably mounted on the first axle receiver and along (ii) a respective pivot axis body releasably mounted on the second axle receiver.

9. The sorting device of claim 8 wherein each respective pivot axis body comprises a respective end section of a pivot axis member which traverses a distance between the first axle receiver and the second axle receiver.

10. The sorting device of claim 8 further including a first shaft mounting extending from the second shaft to the respective pivot axis body on the first side of the endless transport medium and a second shaft mounting extending from the second shaft to the respective pivot axis body on the second side of the endless transport medium, and wherein each respective pivot axis body is pretensioned on the respective axle receiver by an elasticity of the endless transport medium placed on the first shaft and second shaft.

11. The sorting device of claim 10 wherein at least one of the first axle receiver and the second axle receiver includes a respective slot having a slot opening facing away from the first shaft and wherein the respective pivot axis body mounted on the at least one of the first axle receiver and second axle receiver is received on the respective axle receiver in the respective slot and pretensioned on that respective axle receiver against a closed portion of the respective slot.

12. The sorting device of claim 1 wherein the first shaft comprises a drive shaft which drives the endless transport medium to circulate around the first shaft and second shaft whereas the second shaft comprises an undriven deflection shaft.

13. The sorting device of claim 1 wherein the first shaft defines a first end mounted on the base body with a remainder of the first shaft comprising a cantilevered member extending away from the base body.

14. The sorting device of claim 1 wherein the pivot axis is defined along a pivot axis body and wherein the first shaft is spaced apart from the pivot axis body by a pivot axis gap.

15. The sorting device of claim 1 wherein the first axis and pivot axis define a pivot axis plane and the second axis moves through the pivot axis plane as the second shaft moves from the lower pivot position to the upper pivot position and from the upper pivot position to the lower pivot position.

16. The sorting device of claim 15 wherein a pretensioning force generated between first shaft and the second shaft by the endless transport medium has a maximum value when the second axis lies in the pivot axis plane such that when the second axis lies off of the pivot axis plane the second shaft is pushed away from the pivot axis plane toward one of the upper pivot position and the lower pivot position to reduce the pretensioning force from the maximum value.

17. The sorting device of claim 1 further including:
(a) an additional second shaft spaced apart from the first shaft and positioned relative to the first shaft so that a longitudinal axis of the additional second shaft comprising an additional second axis extends parallel to the first axis, the additional second shaft being pivotable about an additional pivot axis between a lower pivot position and an upper pivot position for the additional second shaft, where the additional pivot axis is spaced apart from, and extends substantially parallel to, the first axis, and where the additional second shaft is spaced apart from the second shaft in the first direction; and
(b) an additional endless transport medium placed on the first shaft and the additional second shaft in a position spaced apart from the endless transport medium in the first direction to form an additional upper run for supporting and for conveying products in the conveying direction, the additional upper run in both the lower pivot position and upper pivot position of the additional second shaft extending substantially linearly in an additional conveyance plane parallel to the conveyance plane.

* * * * *